March 4, 1941.  W. G. WEHR  2,233,929

MATERIAL HANDLING APPARATUS

Filed March 22, 1939  2 Sheets-Sheet 1

INVENTOR.
WILLIAM G. WEHR
BY Kwis Hudson & Kent
ATTORNEYS

March 4, 1941.  W. G. WEHR  2,233,929
MATERIAL HANDLING APPARATUS
Filed March 22, 1939   2 Sheets-Sheet 2

INVENTOR.
WILLIAM G. WEHR
BY
ATTORNEYS

Patented Mar. 4, 1941

2,233,929

UNITED STATES PATENT OFFICE 2,233,929

MATERIAL HANDLING APPARATUS

William G. Wehr, East Cleveland, Ohio, assignor to The Cleveland Crane & Engineering Company, Wickliffe, Ohio, a corporation of Ohio Application March 22, 1939, Serial No. 263,474

8 Claims. (Cl. 294—81)

The present invention relates to material handling equipment and more particularly to a grab especially adapted to handle material, such as pulp, paper, straw, cotton, etc., in bale form.

An object of the present invention is the provision of a novel apparatus for handling bales of material, such as pulp, paper, straw, etc., which engage only the tops of the bales, thus permitting the bales to be placed tightly together when being stored etc., conserving space and producing a pile that will not easily topple over.

Another object of the present invention is the provision of a novel apparatus particularly adapted for handling material in bale form comprising a plurality of downwardly projecting spiral tines or screws adapted to engage in the material to be handled, which apparatus will be simple in construction and reliable in operation, and can be engaged and disengaged from the material to be handled without manual assistance.

Another object of the invention is the provision of a novel apparatus particularly adapted for handling material in bale form comprising a plurality of downwardly projecting spiral tines or screws adapted to engage in the material to be handled, and a reversible electric motor directly connected to said tines for rotating the same.

Another object of the invention is the provision of a novel carrier for an overhead tramrail system comprising hoist mechanism, a control cab, a grab suspended from the hoist mechanism and including a plurality of downwardly projecting spiral tines or screws, a reversible electric motor directly connected to said tines for rotating the same, and control mechanism for the reversible electric motor.

Another object of the present invention is the provision of a novel apparatus particularly adapted for handling material in bale form comprising a grab adapted to handle a plurality of bales or packages of material at one time by engaging the upper sides thereof and comprising means for compensating for variations in the sizes of the bales or packages handled.

The present invention resides in certain novel details of construction and combinations and arrangements of parts, and further objects and advantages thereof will be apparent to those skilled in the art to which the invention relates from the following description of the preferred embodiments thereof described with reference to the accompanying drawings in which similar reference characters designate corresponding parts throughout the several views and in which Fig. 1 is a side elevation of an overhead monorail carrier embodying the present invention;

Figure 1:
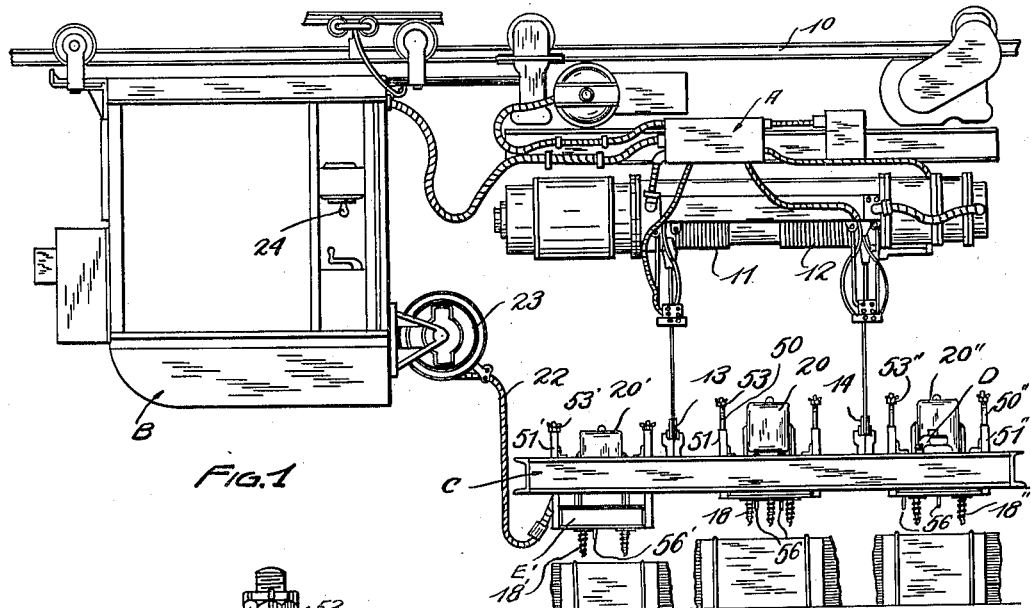
Figure 4:
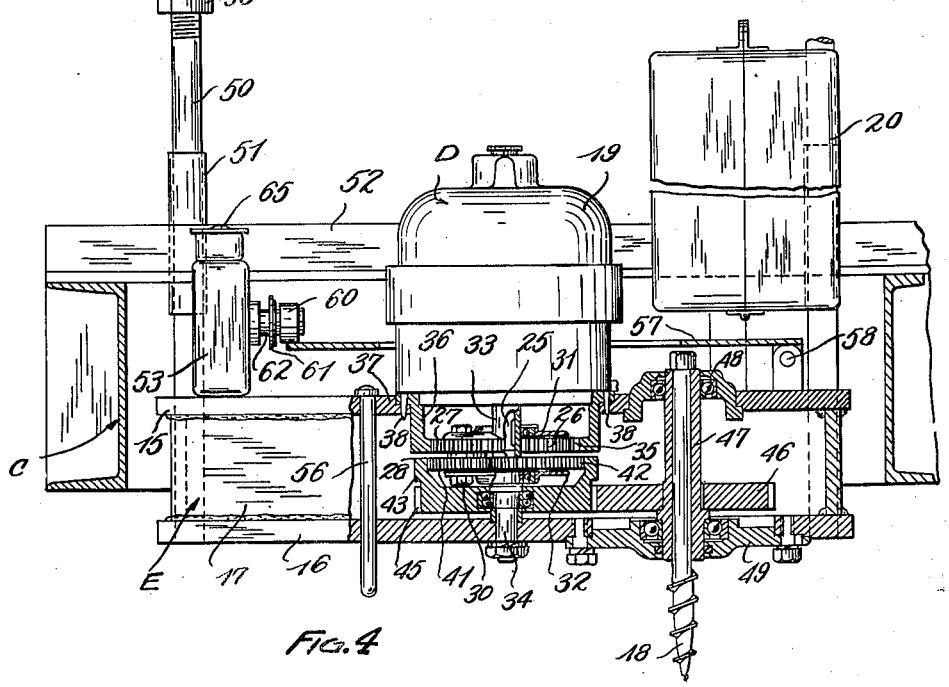
Fig. 4 is a section on the line 4—4 of Fig. 2 with portions in elevation.

While the present invention is susceptible of various modifications and alternative constructions, it is herein illustrated and described as embodied in or applied to a carrier for an overhead tramrail system. However, it is to be understood that the grab of the present invention may be used with material handling equipment other than overhead tramrail systems, such as various types of cranes, etc.

The overhead tramrail system shown, in which the preferred embodiments of the invention are incorporated, is for the most part commercially known in the art, and only those parts thereof which are necessary to a complete understanding of the present invention are illustrated in the drawings and herein described in detail.

Figure 2:
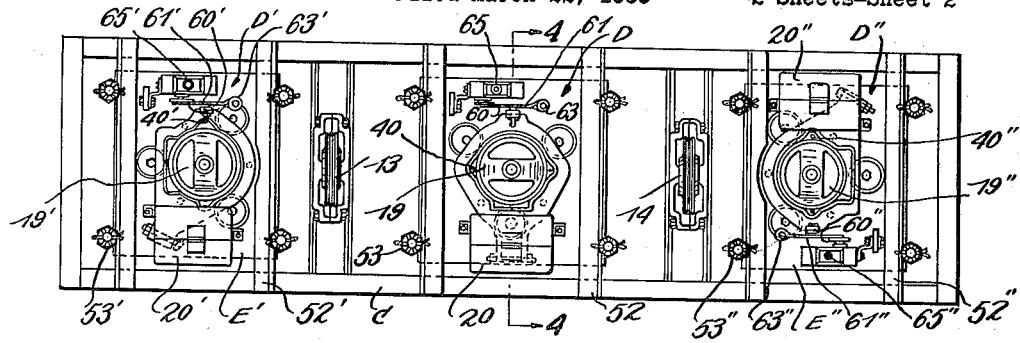
Fig. 2 is a plan view of the grab shown in Fig. 1.
Figure 3:
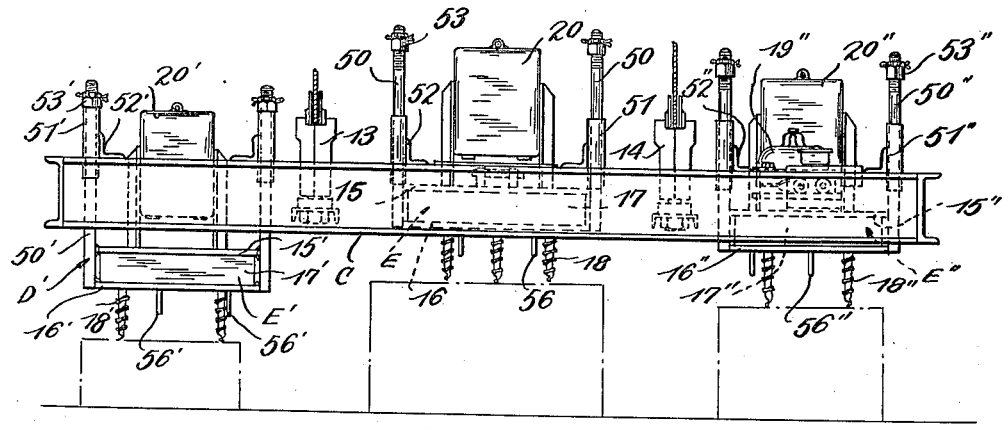
Fig. 3 is a side elevation of the grab shown in Fig. 1.
Figure 5:
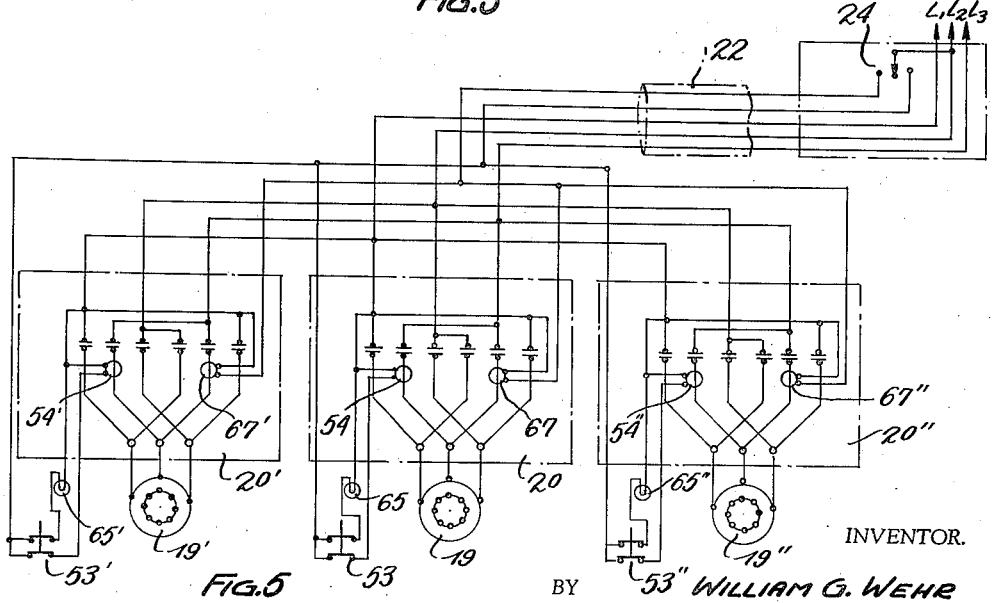
Fig. 5 is a wiring diagram of the electrical circuit employed in the grab shown in the preceding figures.

Referring to Figs. 1, 2 and 3 of the drawings, the reference character A designates a commercially known electrically propelled open cab type of carrier adapted to travel along the overhead monorail 10 forming a part of an electrified overhead tramrail system, under the control of an operator seated in the control cab. The carrier A includes two electric hoists 11 and 12 adapted to be controlled by a manually operable controller located in the cab B. The grab proper, comprising a frame designated generally by the reference character C, is suspended from the hoist mechanism through the medium of blocks 13 and 14 connected to the frame C in any convenient manner.

The frame C is constructed of structural shapes welded together and carries three substantially similar units D, each one of which is adapted to engage and lift a separate or individual bale or package of material; however, two or more of the units may be employed to lift a single bale or package of material if desired. The units D are supported in the frame C in such a manner that each unit is free to move vertically within certain limits, thus allowing the individual units to adjust themselves to bales or packages of different heights. Since the units are substantially alike only one thereof will be described in detail, and the corresponding elements of the other units designated by the same reference character with a prime mark or a double prime mark applied thereto. For this purpose the center unit D is selected because the pivot for the limit switch operating plate is directly opposite the roller carried by the limit switch operating arm, whereas, in the end units, the pivots are located adjacent to one of the outside corners. However, the operation is the same in each instance.

Each unit D comprises a frame E composed of upper and lower plates 15 and 16, respectively, held together and in spaced relation by channel members 17 interposed therebetween and welded thereto along the edges. Projecting downwardly from the frame E are three spiral tines 18, rotatably supported in the frame in a manner hereinafter specifically referred to and operatively connected to a reversible electric motor 19 fixed to the upper plate 15 of the frame E. The electric motor 19 is adapted to be controlled from the cab B through the medium of a contactor panel 20 of conventional construction fixed to the frame E, a flexible cable 22 adapted to be wound and unwound from the reel 23 of conventional construction fixed to the side of the cab B, and a controller 24 located at a convenient place in the cab.

The armature of the motor 19 is adapted to rotate about a vertical axis and the lower end of the armature shaft 25 which projects into the frame E has a gear 26 keyed thereto, which gear is continuously in mesh with the upper gear 27 of a gear cluster 28 forming part of a planetary type speed reducing mechanism. The gear cluster 28 is rotatably supported on a stub shaft 30 fixed in upper and lower disk-like members 31 and 32, respectively. The upper disk member 31 is rotatably supported on the hub 33 of the gear 26 and the lower disk member 32 is rotatably supported on the upper end of a shaft 34 fixed in the lower plate 16 coaxially with the armature shaft 25 of the motor 19. The upper gear 27 of the gear cluster 28 is continuously in mesh with an internal gear 35 formed on the lower end of a sleeve member 36, the upper end of which is provided with a flange 37 interposed between the housing of the motor 19 and the upper plate 15 of the frame E. Dowel pins 38 prevent relative rotation between the frame E, the member 36, and the housing for the motor 19. The motor 19 is bolted to the upper plate 15 of the frame by means of bolts 40 on either side thereof. The gear cluster 28 includes a lower gear 41 slightly larger in diameter than the gear 27, continuously in mesh with an internal gear 42 formed on an upwardly extending flange 43 of a centrally located driving gear 45. The driving gear 45 is rotatably supported for rotation about the shaft 34 below the disk member 32.

As shown, the grab comprises three spiral tines 18 located equidistant from the axis of rotation of the driving gear 45 and operatively connected thereto through the medium of driven gears 46 keyed to sleeve members 47, within which the tines proper are detachably secured. The sleeve members 47 are rotatably supported in upper and lower members 48 and 49, respectively, detachably supported in suitable apertures in the upper and lower plates 15 and 16, respectively. The lower aperture is larger than the driven gear 46 and the construction is such that the tine or screw assemblies can be removed and replaced as units.

Each unit D is slidably supported for limited vertical movement in the frame C through the medium of guide rods 50 welded adjacent to the corners of the frames E and extending upwardly through sleeve members 51 welded to angle irons 52 forming a part of the frame C. The movement of the units D relative to the frame C in an upward direction is limited by the engagement of the upper plates 15 thereof with the lower ends of the sleeve members 51 and the downward movement of the units is limited by adjustable nuts 53 threaded on the upper ends of the guide rods. This construction which permits each unit to move vertically relative to the frame C and the other units allows the units to accommodate themselves to bales varying in thickness, as clearly shown in Fig. 1.

In some instances the tines of one unit D may be wholly engaged in the material to be handled in advance of the tines of one or more of the other units, and since the control mechanism in the control cage is common to all units provision is made on the grab for automatically disconnecting the motor of each unit from the source of supply, as the tines thereof become wholly engaged in the material to be lifted thereby independent of the other units.

In the preferred embodiment of the invention shown this is accomplished by limit switches 53 located in series with the closing solenoids 54 which when energized through the switch 24 in the control cab B cause the motors to rotate the tines in a right-hand direction. The limit switches 53 are adapted to be opened when the tines of the unit D with which they are associated become wholly engaged in the material being handled through the medium of limit switch pins 56 slidably supported in the frames E. The lower ends of the pins 56 project through the bottom plates 16 of the units D, and the upper ends thereof are enlarged and engage the upper surfaces of the plates 15 when the pins are in the lower position. The upper ends of the limit switch pins are adapted to engage underneath and raise a limit switch operating plate 57 as the pins are moved upwardly by their engagement with the material being handled. The plate 57 is pivotally connected to the frame E by a pintle pin 58 and the end thereof opposite the pivot projects underneath a roller 60 carried by the limit switch operating arm 61 fixed to the operating lever 62 of the limit switch. A weight 63 fixed to the free end of the arm 61 continuously urges the same in a downward direction, that is in a direction to maintain the circuit through the limit switch closed. Pilot lights 65 connected to the upper sides of the limit switches give a visual indication as to whether the circuits through the switches are open or closed. The contactor panels 20 also include closing solenoids 67, which when energized through the switch 24 located in the control cab B causes the motors to rotate in a direction to turn the tines in a left-hand direction.

It is believed that the operation of the device will be apparent to those skilled in the art to which it relates from the foregoing description. While the embodiment of the invention shown has been described in considerable detail, it is to be understood that the invention may be otherwise embodied and is not limited to the particular construction herein described. While the tines or screws shown closely resemble a conventional right-hand screw in construction, it will be apparent that they may be otherwise constructed.

It is the intention to cover hereby all modi-

Having thus described my invention I claim:

1. In apparatus for handling material the combination of a frame adapted to be suspended from an overhead support, and a plurality of individual grab units supported in said frame for limited vertical movement, each of said units comprising: a plurality of downwardly projecting rotatably supported spiral tines, driving means for rotating said tines, and means including a member adapted to engage the material being handled and be actuated thereby for automatically rendering said driving means inoperative when said tines have reached a predetermined depth in the material.

2. In apparatus for handling material the combination of a frame adapted to be suspended from an overhead support, and a plurality of individual grab units supported in said frame for limited vertical movement, each of said units comprising: a plurality of downwardly projecting rotatably supported spiral tines, reversible driving means for rotating said tines, and means including a member adapted to engage the material being handled and be actuated thereby for automatically rendering said driving means inoperative to further rotate said tines in a direction to engage the same in said material when said tines have reached a predetermined depth therein.

3. In apparatus for handling material the combination of a frame adapted to be suspended from an overhead support, and a plurality of individual grab units supported in said frame for limited vertical movement, each of said units comprising: a plurality of downwardly projecting rotatably supported spiral tines, an electric motor operatively connected to said tines for rotating the same in opposite directions, and means including a member adapted to engage the material being handled and be actuated thereby for automatically rendering said motor inoperative to further rotate said tines in a direction to engage the same in said material when said tines have reached a predetermined depth therein.

4. In apparatus for handling material the combination of a frame adapted to be suspended from an overhead support, and a plurality of individual grab units supported in said frame for limited vertical movement, each of said units comprising: a plurality of downwardly projecting rotatably supported spiral tines, a reversible electric motor directly connected to said tines for rotating the same in opposite directions, control means including a limit switch for causing said motor to be actuated in a direction to engage said tines in material being handled, and means including a member adapted to be engaged by the material being handled and moved thereby for actuating said limit switch to render the motor inoperative to further engage said tines in the material after they have reached a predetermined depth therein.

5. In apparatus for handling material the combination of: a frame adapted to be suspended from an overhead support, a plurality of individual grab units supported in said frame for limited vertical movement, each of said units comprising: a plurality of downwardly projecting rotatably supported spiral tines, a reversible electric motor, means for directly connecting said tines and said motor, common control means for causing said motors to be actuated in a direction to engage said tines in material being handled, and means associated with each of said units and including a member adapted to be engaged by the material being handled and actuated thereby for automatically rendering the motor thereof inoperative to further engage the tines in the material when they have reached a predetermined depth therein.

6. In apparatus for handling material the combination of an overhead traveling support, a frame, means for suspending said frame from said overhead traveling support, and a plurality of individual grab units supported in said frame for limited vertical movement, each of said units comprising: a plurality of downwardly projecting rotatably supported spiral tines, driving means for rotating said tines, and means including a member adapted to be engaged by the material being handled and actuated thereby for automatically rendering said driving means inoperative when said tines have reached a predetermined depth in the material.

7. In apparatus for handling material the combination of an overhead traveling support including hoist mechanism and a control cab, a load supporting grab suspended from said hoist mechanism and comprising a plurality of individual grab units supported in a frame for limited vertical movement each including a plurality of downwardly projecting rotatably supported spiral tines, reversible driving means for rotating said tines, means located in said cab for actuating the driving means to rotate said tines in a direction to engage the same in material being handled, and means including a member adapted to be engaged by the material being handled and actuated thereby for automatically rendering said driving means inoperative to further rotate the tines of any unit in a direction to engage the same in the material when said tines have reached a predetermined depth therein.

8. In apparatus for handling material the combination of an overhead traveling support including hoist mechanism and a control cab, a load supporting grab suspended from said hoist mechanism and comprising a plurality of individual grab units supported in a frame for limited vertical movement each including a plurality of downwardly projecting rotatably supported spiral tines, an electric motor for each unit operatively connected to said tines thereof for rotating the same in opposite directions, control means in the control cab for actuating said motors to rotate said tines associated therewith in a direction to engage the same in material being handled, and means including a member adapted to be engaged by the material being handled and actuated thereby for automatically rendering said motors inoperative to further rotate said tines of the unit with which it is associated in a direction to engage the same in said material when said tines have reached a predetermined depth therein.

WILLIAM G. WEHR.